United States Patent [19]

Malicki

[11] Patent Number: 4,630,490

[45] Date of Patent: Dec. 23, 1986

[54] COMPRESSION STRAIN GAUGE TRANSDUCER ASSEMBLY

[75] Inventor: Raymond W. Malicki, Dearborn Heights, Mich.

[73] Assignee: Carron & Company, Inkster, Mich.

[21] Appl. No.: 754,623

[22] Filed: Jul. 12, 1985

[51] Int. Cl.$^4$ .............................. G01L 1/22; G01B 7/18
[52] U.S. Cl. ................................... 73/862.65; 73/761; 73/768; 338/5
[58] Field of Search ............... 73/761, 768, 862.65; 338/5

[56] References Cited

U.S. PATENT DOCUMENTS

| | | |
|---|---|---|
| 2,393,714 | 1/1946 | Simmons, Jr. . |
| 2,600,029 | 6/1952 | Stone . |
| 2,747,454 | 5/1956 | Bowersett . |
| 2,873,341 | 2/1959 | Kutsay . |
| 2,925,576 | 2/1960 | Wakeland et al. . |
| 3,091,961 | 6/1963 | Piell ............................ 73/862.55 |
| 3,132,319 | 5/1964 | Brooks, Jr. . |
| 3,201,977 | 8/1965 | Kutsay . |
| 3,212,325 | 10/1965 | Katz et al. . |
| 3,905,356 | 9/1975 | Fletcher et al. . |
| 4,042,049 | 8/1977 | Reichow et al. . |
| 4,127,788 | 11/1978 | Daugherty . |
| 4,200,855 | 4/1980 | Gilcher . |
| 4,203,318 | 5/1980 | Yorgiadis . |
| 4,280,363 | 7/1981 | Johansson . |
| 4,429,579 | 2/1984 | Wilhelm . |

Primary Examiner—Charles A. Ruehl
Attorney, Agent, or Firm—Brooks & Kushman

[57] ABSTRACT

A compression strain gauge transducer assembly (10) includes a sensing member (14) that receives a strain gauge transducer (16) within a counterbored hole (26) through a head (18) and shank (20) of the sensing member. An inner pilot end (28) of the sensing member hole receives a pilot (40) of the transducer with flat annular seats (30) and (40) of the hole and the transducer engaged in a manner that provides accurate readings of compression loads in association with the pilot construction. An intermediate portion (46) of the transducer (16) has outer surfaces (48) that define a square cross section with strain gauges (50) mounted on the outer surfaces axially inward from a threaded outer transducer portion (52) received by a threaded outer portion (34) of the sensing member hole (26). Wires (54) extend from the strain gauges (50) through a wire passage (58) in the threaded outer portion (52) of the transducer to an electrical connector (38) that facilitates the electrical reading of compression loading applied to a distal end (24) of the sensing member shank.

3 Claims, 3 Drawing Figures 4,630,490

COMPRESSION STRAIN GAUGE TRANSDUCER ASSEMBLY

TECHNICAL FIELD

This invention relates to a strain gauge transducer assembly for sensing compression loading.

BACKGROUND ART

The most conventional way for sensing compression loading is disclosed by U.S. Pat. Nos. 2,873,341 Kutsay and 3,201,977 Kutsay wherein strain gauges are secured directly to a member whose compression loading is to be sensed. Usually the strain gauges are secured by potting, as disclosed by the Kutsay patents, internally within a hole in the member which often takes the form of a threaded bolt. However, prior art transducers have also included strain gauges secured externally to outer surfaces of a bolt to sense loading.

Another transducer for sensing compression loading is disclosed by the U.S. Pat. No. 2,925,576 of Wakeland et al wherein a round shaft has a strain gauge secured thereto intermediate a cone shaped inner end of the transducer and a threaded outer portion thereof that is received by the threaded outer end of a hole in a bolt. One problem with this type of transducer is that the conical inner end thereof does not seat during the threading of the outer end thereof into the bolt hole. As such, it is difficult to obtain accurate readings. Furthermore, the round intermediate portion of the transducer on which the strain gauges are mounted does not lend itself to accurate readings.

Other strain gauge transducers and the like are disclosed by U.S. Pat. Nos.: 2,393,714 Simmons, Jr.; 2,600,029 Stone; 2,747,454 Bowersett; 3,132,319 Brooks, Jr.; 3,212,325 Katz et al; 3,905,356 Fletcher et al; 4,042,049 Reichow et al; 4,127,788 Daugherty; 4,200,855 Gilcher; 4,203,318 Yorgiadis; 4,280,363 Johansson; and 4,429,579 Wilhelm.

DISCLOSURE OF INVENTION

An object of the present invention is to provide an improved compression strain gauge transducer assembly that is easy to install while still being effective in use to provide accurate readings of compression loading.

In carrying out the above object, a compression strain gauge transducer assembly constructed in accordance with the present invention includes a sensing member having a head and a shank extending from the head along a central axis of the sensing member. The shank has threads for mounting the sensing member and has a distal end at which the shank is loaded in compression. A counterbored hole extends through the head of the sensing member and into the shank thereof along the cental axis. This counterbored hole includes an inner pilot end, an annular seat of a flat shape extending radially outward from the inner pilot end in a perpendicular relationship to the central axis, an intermediate portion extending axially outward from the annular seat preferably with a round cross section, and a threaded outer portion.

A strain gauge transducer of the assembly is received within the counterbored hole of the sensing member and has a central axis coaxial with the central axis of the counterbored hole in the sensing member. This transducer includes an inner pilot received within the inner pilot end of the counterbored hole to locate the transducer. An annular seat of the transducer extends radially outward from the inner pilot thereof and has a flat shape extending perpendicular to the central axis thereof in engagement with the annular seat of the counterbored hole in the sensing member. An intermediate portion of the transducer extends axially outward from the inner pilot thereof and has four outer surfaces defining a square cross section. At least two strain gauges are also provided with each mounted on an associated outer surface of the square intermediate transducer portion. A threaded outer portion of the transducer is connected to the intermediate portion thereof and threaded into the threaded outer portion of the counterbored hole in the sensing member to maintain an engaged relationship of the annular seats. Wires extend from the strain gauges to permit sensing of compression loading applied to the distal shank end of the mounted sensing member.

The construction of the compression strain gauge transducer assembly as described above facilitates the mounting thereof for sensing of compression loading by forces applied to the distal end of the shank of the sensing member. Furthermore, it has been found that the square cross section of the intermediate portion of the tranducer and the provision of the pilot for the transducer as well as the flat seats of the transducer and the counterbored hole of the sensing member provide accurate reading of compression loadings in a manner which has not been heretofore possible with prior art strain gauge transducers.

In the preferred construction of the compression strain gauge transducer assembly, the counterbored hole of the sensing member has an outer end that receives an electrical connector connected to the strain gauge wires. An axial wire passage through the threaded outer portion of the transducer is also provided with the wires extending therethrough between the strain gauges and the electrical connector.

In its preferred construction, the compression strain gauge transducer assembly also has the inner pilot end of the counterbored hole in the sensing member provided with a round cross section just slightly larger than the inner pilot of the transducer which also has a round cross section. Axially outward from the round inner pilot, the intermediate portion of the transducer has its square cross section sized with the diagonal thereof just slightly smaller than the diameter of the intermediate portion of counterbored hole so as to permit the strain gauges to be located on oppositely facing surfaces with the wires extending around the transducer. Also, the threaded outer portion of the transducer through which the axial passage extends is provided with a wrench opening for threading the transducer into the sensing member with the round pilot guided by the round inner pilot end of the counterbored hole to fix the engaged seats with each other in an accurately aligned relationship with the central axis of the sensing member.

The objects, features, and advantages of the present invention are readily apparent from the following detailed description of the best mode for carrying out the invention when taken in connection with the accompanying drawings.

BEST MODE FOR CARRYING OUT THE INVENTION

Figure 1:
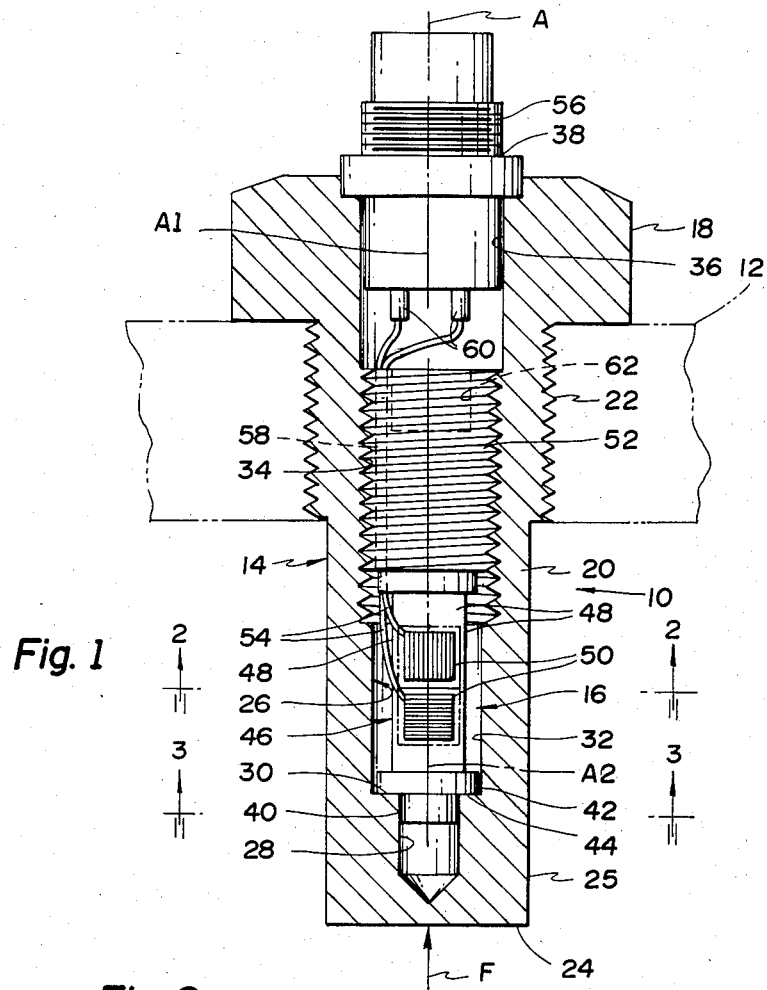
FIG. 1 is a longitudinal sectional view taken through a compression strain gauge transducer assembly constructed in accordance with the present invention.

With reference to FIG. 1 of the drawings, a compression strain gauge transducer assembly constructed in accordance with the present invention is generally indicated by 10 and is illustrated mounted on a schematically indicated support member 12. As is hereinafter more fully described, assembly 10 includes a sensing member 14 to which a compression load is applied as indicated by arrow F with the assembly mounted on the support member 12. Assembly 10 also includes a strain gauge transducer 16 received within the sensing member 14 to sense the compression loading. The construction of the sensing member 14 and strain gauge transducer 16 of the assembly 10 provides quick mounting and removal while still permitting accurate readings of the compression loading as described below.

As illustrated in the drawings, the sensing member 14 includes a head 18 and a shank 20 extending from the head along a central axis A1 which is coaxial with a central axis A of the entire assembly 10. Shank 20 has threads 22 for mounting the sensing member 14 in a threaded hole of the support member 12. In this connection, it is also preferable for the head 18 to be of a hexagonal or other shape to which a wrench can be easily applied to provide torquing of the sensing member 14 upon mounting and removal of assembly 10 from the support member 12. Shank 20 of the sensing member 14 also has a distal end 24, as shown in FIG. 1, at which the compression load F is applied as previously mentioned. Between the threads 22 and the distal end 24, the shank 20 preferably has a round, unthreaded outer surface 25 whose center is positioned along the central axis A.

Figure 3:
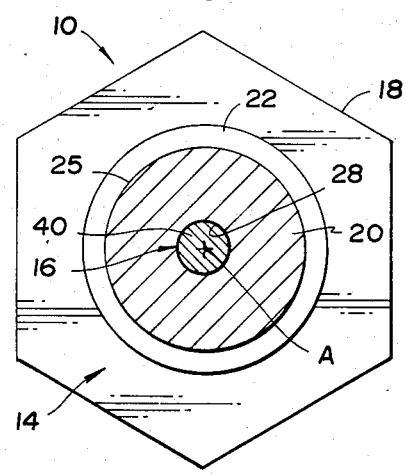
FIG. 3 is a cross-sectional view taken through the assembly along the direction of line 3—3 in FIG. 1.

As best illustrated in FIG. 1, a counterbored hole 26 extends through the head 18 of the sensing member 14 into its shank 20 and receives the strain gauge transducer 16 as is more fully described below. The counterbored hole 26 includes an inner pilot end 28 that extends axially with a round cross section whose center is located at the central axis A as illustrated in FIG. 3. An annular seat 30 of the counterbored hole 26 has a flat shape extending radially outward from the inner pilot end 28 in a perpendicular relationship to the central axis A. As illustrated, the annular seat 30 has a round shape with an outer diameter approximately twice the size of the diameter of the inner pilot end 28. An intermediate portion 32 of the counterbored hole 26 extends axially outward with a round cross section from the annular seat 30 to a threaded outer portion 34 whose minor thread diameter is preferably equal to the diameter of the round cross section of the intermediate hole portion. Also, the counterbored hole 26 preferably has an unthreaded outer end 36 for receiving an electrical connector 38 as is hereinafter more fully described.

As previously mentioned, the strain gauge transducer of the assembly is received within the counterbored hole 26 and has a central axis A2 coaxial with the central axis A of the assembly 10 and with the central axis A1 of the sensing member 14. An inner pilot 40 of the strain gauge transducer 16 is received within the inner pilot end 28 of the counterbored hole with a close tolerance fit so as to maintain the coaxial relationship of the strain gauge transducer 16 with the sensing member 14.

A round inner flange 42 of the strain gauge transducer 16 defines an annular seat 44 that extends outwardly from the inner pilot 40 with a flat shape extending perpendicular to the central axis A2 in engagement with the annular seat 30 of the counterbored hole 26 in sensing member 14. This engagement of the transducer seat 44 with the sensing member seat 30 in the perpendicular relationship to the central axis A with the inner pilot 40 of the transducer received within the inner pilot end 28 of the counterbored hole is an extremely important and essential feature of the assembly in order to obtain accurate readings.

Figure 2:
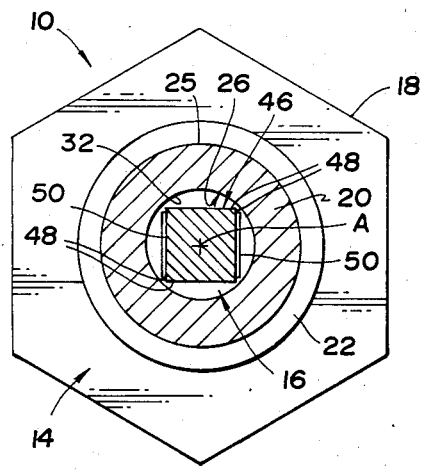
FIG. 2 is a cross-sectional view through the assembly taken along the direction of line 2—2 in FIG. 1.

As illustrated in both FIGS. 1 and 2, an intermediate portion 46 of the transducer 16 extends axially outward from the inner pilot 40 and the flange 42 on which the transducer seat 44 is provided. This transducer intermediate portion 46 as best illustrated in FIG. 2 has four outer surfaces 48 defining a square cross section whose center is positioned along the central axis A of the assembly and maintained in this position by the construction of the both the sensing member 14 and the transducer 16. At least two strain gauges 50 are utilized with each mounted on an associated outer surface 48 of the square intermediate transducer portion to provide sensing of the compression loading. The square cross section of the intermediate transducer portion 46 is an extremely important and essential feature in providing the transducer with the ability to carry compressive loads without bending excessively upon such loading.

As illustrated in FIG. 1, the strain gauge transducer 16 includes a threaded outer portion 52 connected to the intermediate portion 46 of the transducer and threaded into the threaded outer portion 34 of the counterbored hole 26 in the sensing member 14. The threaded relationship of the transducer portion 52 into the threaded outer portion 34 of the hole maintains an engaged relationship of the sensing member and transducer seats 30 and 44 previously mentioned in a manner that permits accurate sensing of compression loading. As is hereinafter more fully described, wires 54 are connected to the strain gauges 50 and extend outwardly to the electrical connector 38 in order to permit sensing of the compression loading applied to the distal shank end 24 of the mounted sensing member 14.

As mentioned above, the counterbored hole 26 preferably has an unthreaded outer end 36 that receives the electrical connector 38 to which the wires 54 are connected as illustrated in FIG. 1. A complementary connector is thus easily secured to the threads 56 of connector 38 to facilitate the electrical connection for sensing the compression loading. An axial wire passage 58 is also preferably provided in the threaded outer portion 52 of the strain gauge transducer 16. The wires 54 extend axially through the wire passage 58 between the strain gauges 50 and terminals 60 of the electrical connector 38 and have a sufficient length to permit attachment and detachment to the terminals with the connector 38 removed from the sensing member head 18.

As illustrated in FIG. 1, the threaded outer portion 52 of the strain gauge transducer 16 includes a wrench opening 62 of a suitable shape for receiving a complementary wrench that is used to thread the transducer into the counterbored hole 26 and apply a selected preload compressive force to the intermediate portion 46 of the transducer on which the strain gauges 50 are mounted. As illustrated in FIG. 2, the square cross section of the intermediate transducer portion 46 has a diagonal length that is just slightly smaller than the diameter of the diameter of the intermediate hole portion 32 in order to permit the strain gauge wires to extend around the transducer so as to permit mounting of the strain gauges on oppositely facing surfaces 48. As such, the strain gauges can be mounted to provide compensation for bending loading and temperature changes by use of a suitable Wheatstone bridge circuit.

It should be noted that best results are achieved when the flat seats 30 and 44 which are engaged with each other and the transducer surfaces 48 to which the strain gauges 50 are secured are provided with a relatively smooth surface finish on the order of about 25 RMS. Such a smooth surface finish provides good seating and accurate reading of the strain gauge deflection to thereby provide accurate compression loading readings.

While the best mode for carrying out the invention has been described in detail, alternative designs and embodiments for practicing the invention will be apparent to those skilled in the art to which this invention relates as defined by the following claims.

What is claimed is:

1. A compression strain gauge transducer assembly comprising: a sensing member including a head and a shank extending from the head along a central axis of the sensing member; said shank having threads for mounting the sensing member and having a distal end at which the shank is loaded in compression; a counterbored hole extending through the head of the sensing member into the shank thereof along the central axis; said counterbored hole including an inner pilot end, an annular seat of a flat shape extending radially outward from the inner pilot end in a perpendicular relationship to the central axis, an intermediate portion extending axially outward from the annular seat, and a threaded outer portion; a strain gauge transducer received within the counterbored hole of the sensing member and having a central axis coaxial with the central axis of the counterbored hole in the sensing member; said transducer including an inner pilot received within the inner pilot end of the counterbored hole to locate the transducer; an annular seat on the transducer extending radially outward from the inner pilot thereof and having a flat shape extending perpendicular to the central axis thereof in engagement with the annular seat of the counterbored hole in the sensing member; an intermediate portion of the transducer extending axially outward from the inner pilot thereof and having four outer surfaces defining a square cross section; at least two strain gauges each of which is mounted on an associated outer surface of the square intermediate transducer portion; the transducer including a threaded outer portion connected to the intermediate portion thereof and threaded into the threaded outer portion of the counterbored hole in the sensing member to maintain an engaged relationship of the annular seats; and wires extending from the strain gauges to permit sensing of compression loading applied to the distal shank end of the mounted sensing member.

2. A compression strain gauge transducer assembly comprising: a sensing member including a head and a shank extending from the head along a central axis of the sensing member; said shank having threads for mounting the sensing member and having a distal end at which the shank is loaded in compression; a counterbored hole extending through the head of the sensing member into the shank thereof along the central axis; said counterbored hole including an inner pilot end, an annular seat of a flat shape extending radially outward from the inner pilot end in a perpendicular relationship to the central axis, an intermediate portion extending axially outward from the annular seat, a threaded outer portion, and an outer end; a strain gauge transducer received within the counterbored hole of the sensing member and having a central axis coaxial with the central axis of the counterbored hole in the sensing member; said transducer including an inner pilot received within the inner pilot end of the counterbored hole to locate the transducer; an annular seat on the transducer extending radially outward from the inner pilot thereof and having a flat shape extending perpendicular to the central axis thereof in engagement with the annular seat of the counterbored hole in the sensing member; an intermediate portion of the transducer extending axially outward from the inner pilot thereof and having four outer surfaces defining a square cross section; at least two strain gauges each of which is mounted on an associated outer surface of the square intermediate transducer portion; the transducer including a threaded outer portion connected to the intermediate portion thereof and threaded into the threaded outer portion of the counterbored hole in the sensing member to maintain an engaged relationship of the annular seats; an axial wire passage through the threaded outer portion of the transducer; wires extending from the strain gauges through the wire passage in the threaded outer portion of the transducer; and an electrical connector mounted in the outer end of the counterbored hole in the sensing member and connected to the wires to permit sensing of compression loading applied to the distal shank end of the mounted sensing member.

3. A compresson strain gauge transducer assembly comprising: a sensing member including a head and a shank extending from the head along a central axis of the sensing member; said shank having threads for mounting the sensing member and having a distal end at which the shank is loaded in compression; a counterbored hole extending through the head of the sensing member into the shank thereof along the central axis; said counterbored hole including an inner pilot end having a round cross section, an annular seat of a flat shape extending radially outward from the inner pilot end in a perpendicular relationship to the central axis, an intermediate portion extending axially outward from the annular seat with a round cross section, a threaded outer portion, and an outer end; a strain gauge transducer received within the counterbored hole of the sensing member and having a central axis coaxial with the central axis of the counterbored hole in the sensing member; said transducer including an inner pilot of a round cross section received within the round inner pilot end of the counterbored hole to locate the transducer; an annular seat on the transducer extending axially outward from the inner pilot thereof and having a flat shape extending perpendicular to the central axis thereof in engagement with the annular seat of the counterbored hole in the sensing member; an intermediate portion of the transducer extending axially outward from the inner pilot thereof and having four outer surfaces defining a square cross section whose diagonal length is just slightly smaller than the diameter of the intermediate portion of the counterbored hole in the sensing member; at least two strain gauges each of which is mounted on an associated outer surface of the square intermediate transducer portion; the transducer including a threaded outer portion connected to the intermediate portion thereof and threaded into the threaded outer portion of the counterbored hole in the sensing member to maintain an engaged relationship of the annular seats; an axial wire passage through the threaded outer portion of the transducer; the threaded outer portion of the transducer also including a wrench opening for threading the transducer into the sensing member; wires extending from the strain gauges through the wire passage in the threaded outer portion of the transducer; and an electrical connector mounted in the outer end of the counterbored hole in the sensing member and connected to the wires to permit sensing of compression loading applied to the distal shank end of the mounted sensing member.

* * * * *